Jan. 8, 1963  H. F. OHLE  3,072,432
TRUCK CONVERTING DEVICE
Filed May 3, 1960  3 Sheets-Sheet 1
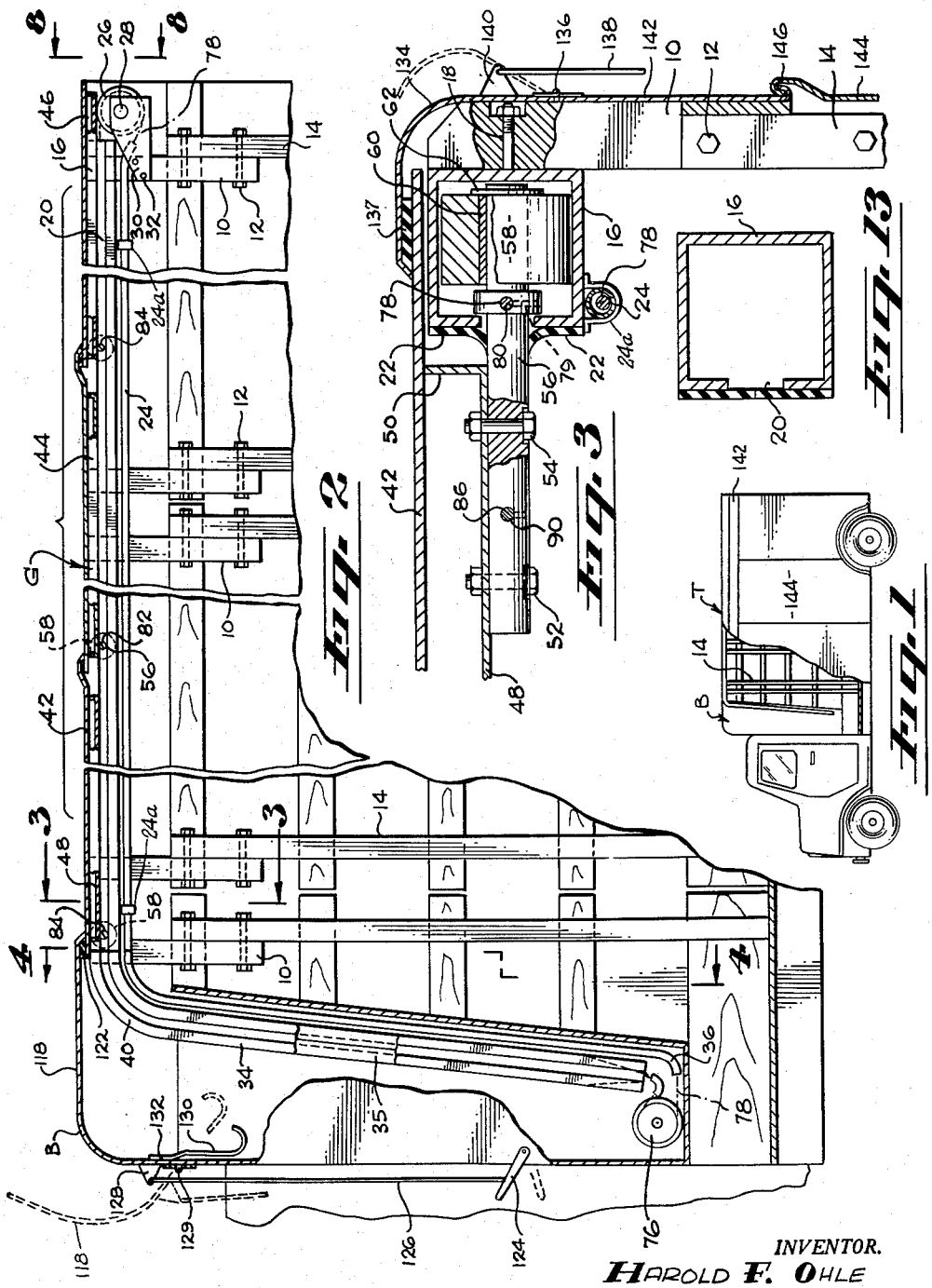
INVENTOR.
*Harold F. Ohle*
BY
FULWIDER, MATTINGLY & HUNTLEY
ATTORNEYS Jan. 8, 1963    H. F. OHLE    3,072,432
TRUCK CONVERTING DEVICE
Filed May 3, 1960    3 Sheets-Sheet 2
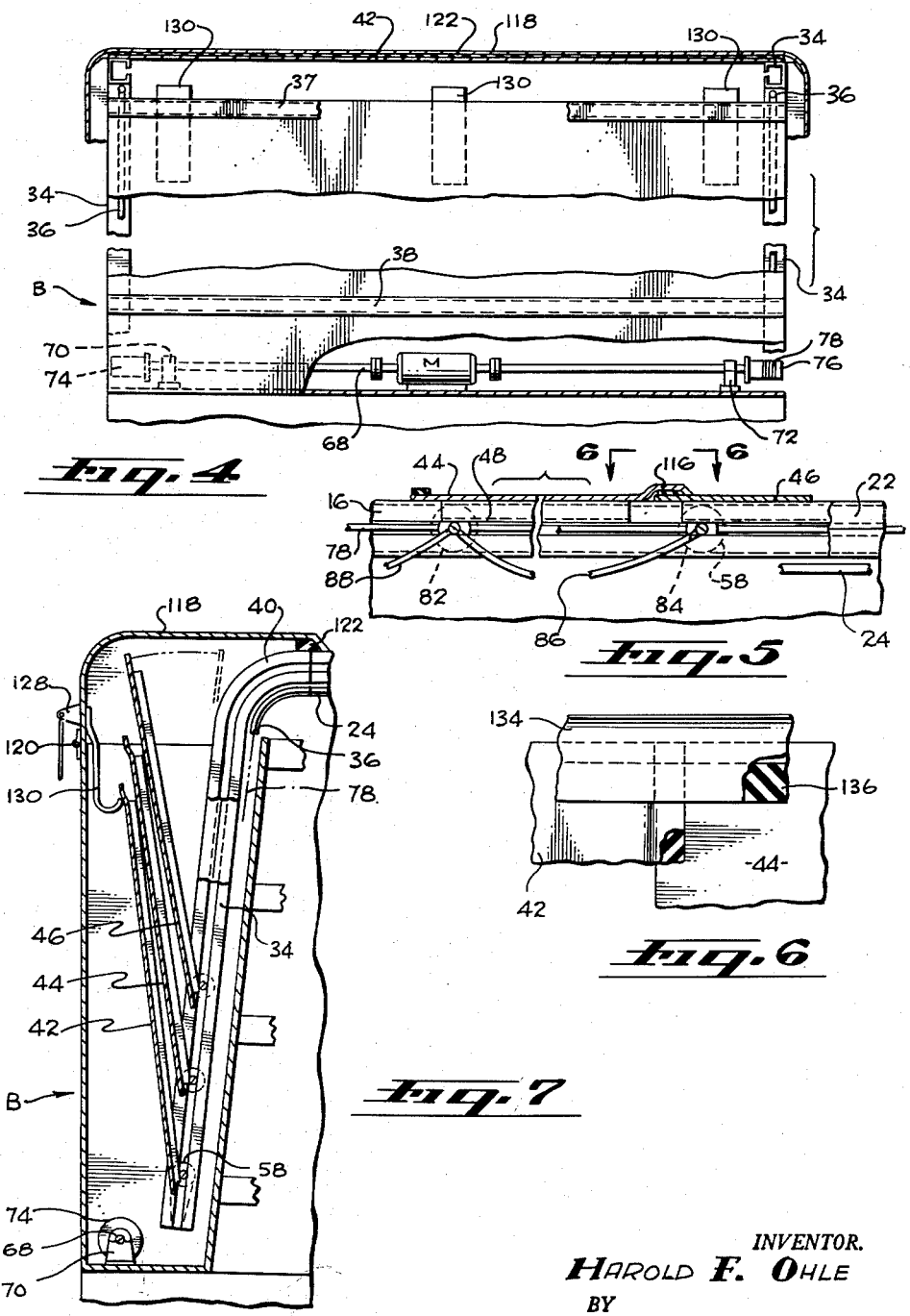
INVENTOR.
HAROLD F. OHLE
BY
FULWIDER, MATTINGLY & HUNTLEY
ATTORNEYS Jan. 8, 1963 H. F. OHLE 3,072,432
TRUCK CONVERTING DEVICE
Filed May 3, 1960 3 Sheets-Sheet 3

INVENTOR.
HAROLD F. OHLE
BY
FULWIDER, MATTINGLY & HUNTLEY,
ATTORNEYS

United States Patent Office 3,072,432
Patented Jan. 8, 1963

3,072,432
TRUCK CONVERTING DEVICE
Harold F. Ohle, 11949 Lesser Ave., Norwalk, Calif.
Filed May 3, 1960, Ser. No. 26,492
6 Claims. (Cl. 296—137)

This invention relates generally to motor truck converting devices and particularly to a detachable mechanism for converting open trucks quickly into covered vans.

One of the main objects of the invention is to provide quickly attachable mechanism for a conventional stake truck which will permit its conversion into a covered van.

It is a theory of the present invention to provide relatively simple mechanism for a stake truck that will permit top panels to be withdrawn from or returned to a detachable box adapted for quick attachment thereto. Motor trucks have many uses and their bodies are usually designed for special performance. There are many times that an operator will desire to change his open stake truck into a covered van. It is intended by the applicant that such conversion be done in simple and economical manner to avoid purchase of two trucks for open and closed use.

Another object of the invention is to provide detachable top panel and roller guide mechanism for a stake truck that will permit its quick conversion into a covered van.

Still another object of the invention is to provide cable actuated, roller guided truck top panels that are movable from a detachable housing to stake truck covering position.

Yet another object of the invention is in the provision of plural top panels movable to and from a detachable housing by means of stake attached roller guides and cable connections.

A further object of the invention is to convert a stake truck to a covered van by timed elevation and disposal of plural top members in guiding mechanism on the top of the truck stakes.

A still further object of the invention is in the cable attached top panels and guiding means therefor which permits timed elevation and return of the panels to convert or reconvert as desired.

With the foregoing objects in view, and such other objects and advantages as will become apparent to those skilled in the art to which this invention relates as this specification proceeds, the invention consists essentially in the arrangement and construction of parts all as hereinafter more particularly described, reference being had to the accompanying drawing in which:

FIGURE 1 is a side elevational view of a stake motor truck with van conversion mechanism attached thereto;

FIGURE 2 is an elevational view partially in section of the detachable van conversion mechanism;

FIGURE 3 is a sectional view taken on the line 3—3 of FIGURE 2;

FIGURE 4 is a sectional view taken on the line 4—4 of FIGURE 2;

FIGURE 5 is an enlarged partial sectional view of the top panel connection;

FIGURE 6 is a plan view taken on the line 6—6 of FIGURE 5;

FIGURE 7 is a sectional elevational view showing the top panels disposed within the detachable box;

FIGURE 13 is a sectional view of the roller guide and sealing means.

Figure 10:
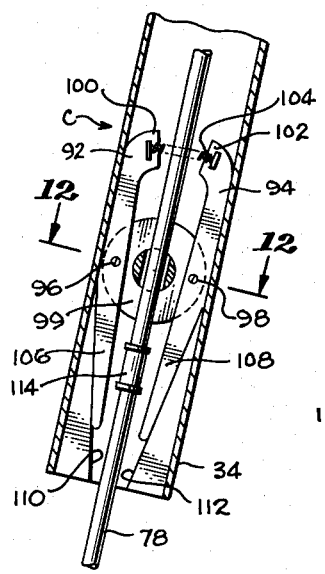
FIGURE 10 is an enlarged elevation of the cable clamp in cable releasing position.

Referring to the drawings, a conventional motor truck having a closed cab and open stake body has been designated generally as T. The theory of the present invention is to provide detachable mechanism for quickly converting the well known stake or open motor truck into a closed van. Applicant provides a detachable box generally referred to as B, which houses plural truck top elements and driving mechanism therefor. The truck operator has merely to secure the box B behind the cab and associate it with roller channels and cable guides generally referred to as G which are readily secured to the top of the body stakes. The top elements may then be moved to body covering postion and the top edges and sides of the stake body readily sealed and covered to form a standard closed van.

Figure 8:
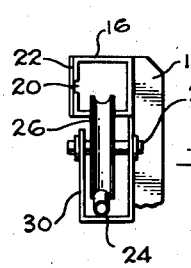
FIGURE 8 is an elevational view taken on the line 8—8 of FIGURE 2.

A preferred embodiment of the invention comprises multiple stub stakes 10 that support the channel and cable guides G. The stub stakes 10 have bolted manually detachable connections 12 with the upper ends of standard truck body stakes 14. The pair of rollers and cable guides G comprise horizontally disposed substantially closed rectangular channels 16 which are bolted as at 18 to the upper ends of each of the stub stakes 10. The channels 16 are shown in detail in FIGURES 3 and 13. They are closed on three sides and the inner sides have continuous longitudinal openings 20 therein. Continuous split rubber seals 22 adhering to the inner channel surfaces cover the openings 20. Dual cable tubes 24 are hung beneath the lower inner ends of the roller guides or channels 16 as by straps 24a welded thereto. A pair of cable pulleys 26 are individually pivotally mounted at 28 in a bifurcated bracket 30 connected at 32 to a rear stub stake 10 as shown in FIGURES 2 and 8.

The box B may be secured to the truck chassis or cab in any manner desired. A second pair of roller guides or channels 34 are secured to cross braces 37 and 38 within the box B. The channels 34 are similar in every respect to earlier described channels 16 with the exception that they lean slightly toward the truck body and have gradually curved elbows 40 that coincide with the forward ends of said channels 16. The channels 34 are also sealed by continuous split rubber inner covers 35. Dual cable tubes 36 provide continuations of the before described tubes 24. Three panels or van top portions are designated 42, 44 and 46, respectively. All of the top panels, as shown in FIGURE 3, have laterally disposed plates 48, flanged at 50 and welded to the under sides thereof. Bolted at 52 and 54 to the plates 48 are outwardly extending stub shafts 56 which are adapted to extend through the rubber seals 22 and 35 and into the two pairs of channels 16 and 34. Rollers 58 having inner bearing surfaces 60 are rotatably secured by means of fixed washers 62 on the outer ends of the stub shafts 56.

In FIGURE 4, a geared motor, electric or otherwise, is secured to the bottom of the box B. A horizontally disposed drive shaft 68, supported near its outer ends in bearings 70 and 72, has dual cable drums 74 and 76, respectively, mounted thereon. The motor may be driven in either direction and controlled manually or automatically as desired. Dual continuous cables 78, similar in every respect, are wound about the drums 74 and 76. The cables 78 pass through tubes 36 and 24, then around pulleys 26. The cables 78, then pass through plural apertures 80, 82 and 84 in the stub shafts 56 and finally are wound about the drums 74 and 76 as shown in FIGURE 4. The cable 78 is clamped at 79 in fixed position in the aperture 80 in the stub shaft 56 but slides through the apertures 82 and 84 in the other shafts. The roller shafts 56 are held together in fixed spaced relationship by means of dual pairs of tie ropes 86 and 88 which connect the plural roller stub shafts at inner positions 90 shown in FIGURE 3.

Figures 11, 12:
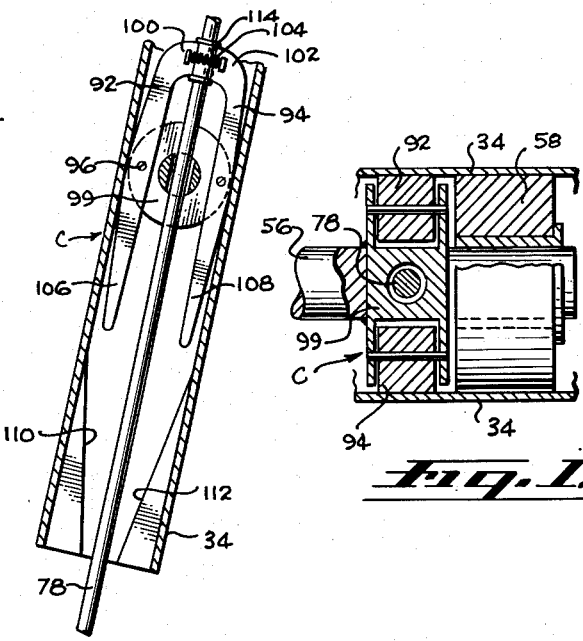
FIGURE 11 is an enlarged elevation of the cable clamp in cable attached position.
FIGURE 12 is a sectional view taken on the line 12—12 of FIGURE 10.
Figure 9:
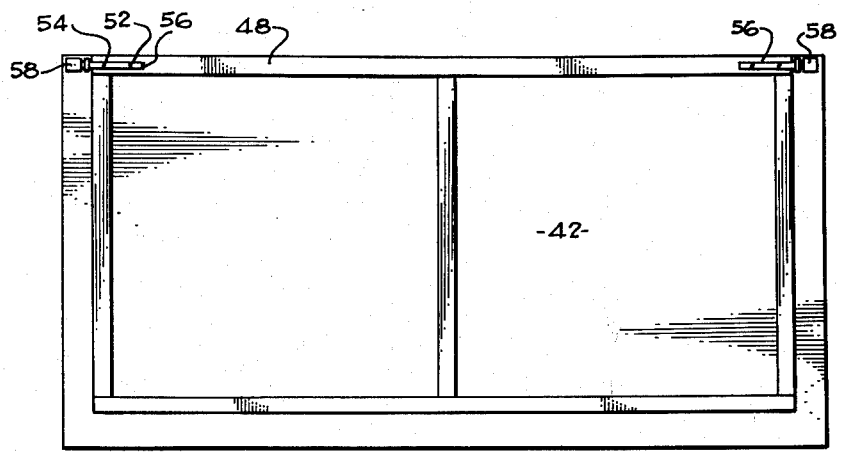
FIGURE 9 is an underside view of a top panel.

A cable and roller releasing and engaging clamp C is shown in FIGURES 10, 11 and 12. The clamp C has two spaced arms 92 and 94 which are pivoted at 96 and 98, respectively, to a collar 99 connected to the roller shaft 56 supporting the top panel 42. The arms 92 and 94 have opposed jaws 100 and 102, respectively, which are connected by means of a tension spring 104. The ends 106 and 108 of the dual arms are fashioned for engagement with dual cam surfaces 110 and 112 in the lower end of the before described channels 34. Bushings 114 are press fitted on the cables 78. It is apparent that a clamp C as described is mounted in both of the channels 34.

The top of panels 42, 44 and 46 which are to be moved from the box B to covering position over the stake truck have laterally disposed raised forward edges 116 that provide a sealing overlap with adjacent top elements. The box B has a cover 118 hinged thereto at 120. The forward inner edge of the cover 118 has a rubber seal 122 thereon which is adapted to engage the forward edge of top panel 42 when in covering position. In FIGURE 2, the cover 118 is shown in position of operation. A lever 124 connected to a rod 126 attached to a bracket 128 on the cover provides means for pivoting the cover 118 about the hinge 129 so that the top panels may emerge from the box B. A top panel actuating bracket 130 secured at 132 to the inner surface of the box B supports the edges of the panels when within the box as shown in FIGURE 7. However, when the cover 118 is in the open position of FIGURE 2, the bracket 130 urges the top panels to an upright position for movement over the stake body.

In FIGURE 3, longitudinally disposed covers 134 for the top sides of the converted truck are shown in detail. The covers 134 disposed on either side are pivoted at 136 to the stub stakes 10 and curve over the upper side edges of the truck when converted to a van. The inner longitudinal edges of the covers 134 have rubber sealing strips 137 thereon. Lever actuated arms 138 pivoted to brackets 140 may be provided for moving the covers 134 to and from position. Side panels 142 secured to the stub stakes may have detachable van side panels 144 hung therefrom at 146. It is intended that the sides of the stake truck may be covered in any manner desired.

In operation, the box B is fitted within the truck body against the front panel. The roller channels and cable tubes mounted on the stub stakes are secured to the truck stakes. When in position with the roller channels in fixed alignment, the operator energizes the motor to move the cables 78 and the top panels out of the box B. The covers 134 are first opened and the cover 118 is also placed in an outward position. Movement of the cables 78 fixed to the panel 46 gradually elevates the top section 46 upwardly and forwardly out of the box B and over the stake body until it is lowered in its rearward position as shown in FIGURE 2. The intermediate panel 44 connected to panel 46 by the tie ropes 86 is quickly picked up and also moved upwardly out of the box B and forwardly to the position shown in FIGURE 2. The final panel 42, also connected by the tie ropes 88 is picked up in a carefully timed manner by the clamps C. The tie rope tends to jerk the panel 42 slightly just as the bushing 114 is between the jaws 100 and 102 as shown in FIGURE 11. The clamps C are thus moved from the cam surfaces 110 and 112 and the jaws tighten on the bushing 114. The top panel 42 and attached clamps are thus moved upwardly and forwardly to covering position as shown in FIGURE 2. The motor is stopped manually or automatically when the panels are in place. The box cover 118 and side covers 134 are then placed in the position of FIGURES 2, 3 and 6 and the sides of the stake truck covered as heretofore described.

To reconvert the van to a stake truck, the covers 118 and 134 are opened and the motor reversed to move the top panels back into the box B. Movement of the cables 78 draw the top panel 42 into the box until the clamps C engage the cams 110 and 112. The jaws of the clamps C are opened as shown in FIGURE 10 to permit release and passage of the cable therethrough. The succeeding top panel 44 connected by the tie ropes 88 is drawn into the box. The last panel 46 also connected by the tie rope 86 is drawn into the box B. Because of the loose tie rope connection and the fixed connection of the panel 46 to the cable, the top panels are maintained in spaced position as shown in FIGURE 7. The seals for the channels and other described seals prevent any accumulation of dirt, dust, etc.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A detachable device for converting a stake truck into a covered van, comprising: a housing mounted on the body of said stake truck, a pair of vertically extending spaced channel members mounted within said housing, a plurality of top panels in said housing having panel rollers in said channel, a pair of detachable channel members, means removably connecting said detachable channel members to the stakes of said truck body, and power operated means for moving said panels out of said housing to cause said panel rollers to engage said detachable channel members.

2. A detachable device for converting a stake truck into a covered van, comprising: a housing mounted on the body of said stake truck, a pair of vertically extending spaced channel members mounted within said housing, a plurality of top panels in said housing having panel rollers in said channels, a pair of detachable channel members, means removably connecting said detachable channel members to the stakes of said truck body in alignment with the channel members in said housing, a cable extending through said vertical and detachable channel members having connection with said rollers therein, and power operated means having driving connection with said cable for moving said panels out of said housing to cause said panel rollers to engage said detachable channel members.

3. A detachable device for converting a stake truck into a covered van, comprising: a housing mounted on the body of said stake truck, a vertically extending channel member mounted on each side of said truck body within said housing, a plurality of top panels in said housing having panel rollers in said channels, said top panels being juxtaposed in a vertical position within said housing for compact storage thereof, a pair of detachable channel members, means removably connecting said detachable channel members to the stakes on opposite sides of said truck body in alignment with the respective channel members in said housing, a cable extending through the channel members on each side of said truck body and having connection with the rollers therein, and power operated means having driving connection with said cables for successively moving said panels out of said housing to cause said panel rollers to engage said detachable channel members for placement of said panels in a truck covering position on said stakes.

4. A detachable device for converting a stake truck into a covered van according to claim 3 wherein said housing is mounted on the forward portion of said truck body.

5. A detachable device for converting a stake truck into a covered van according to claim 3 wherein said power operated means comprises a motor driven shaft having cable pulleys at each end thereof individually connected to said cables, rotation of said shaft causing said cables to be wound on said pulleys for movement of said panel rollers in said channel members.

6. A detachable device for converting a stake truck into a covered van, comprising: a housing mounted on the body of said stake truck, a pair of vertically extending spaced channel members mounted within said housing on opposite sides of said truck body, a plurality of top panels in said housing having panel rollers in said channels, a pair of detachable channel members, means removably connecting said detachable channel members to the stakes of said truck body, power operated means for moving said panels out of said housing to cause said panel rollers to engage said detachable channel members for movement of said panels into truck covering positions, and detachable side panels removably mounted on said stakes to cover the sides of said truck body, whereby said stake truck is converted into a covered van.

References Cited in the file of this patent

UNITED STATES PATENTS

| | | |
|---|---|---|
| 1,306,836 | Perlman | June 17, 1919 |
| 1,713,923 | Schlicher | May 21, 1929 |
| 1,795,897 | Schlicher | Mar. 10, 1931 |
| 1,839,727 | Austin | Jan. 5, 1932 |
| 2,338,309 | Votypka | Jan. 4, 1944 |
| 2,853,340 | Hershberger | Sept. 23, 1958 |
| 2,861,836 | Goeggel | Nov. 5, 1958 |